(12) United States Patent
Rossini et al.

(10) Patent No.: US 8,797,497 B2
(45) Date of Patent: Aug. 5, 2014

(54) PHASE MODULATOR CONTAINING A LIQUID CRYSTAL HAVING A HELICAL STRUCTURE

(75) Inventors: Umberto Rossini, Coublevie (FR); Bruno Mourey, Coublevie (FR)

(73) Assignee: Commissariat a l'Energie Atomique et aux Energies, Paris (FR)

(*) Notice: Subject to any disclaimer, the term of this patent is extended or adjusted under 35 U.S.C. 154(b) by 148 days.

(21) Appl. No.: 13/581,461

(22) PCT Filed: Mar. 7, 2011

(86) PCT No.: PCT/EP2011/053392
§ 371 (c)(1),
(2), (4) Date: Aug. 27, 2012

(87) PCT Pub. No.: WO2011/110526
PCT Pub. Date: Sep. 15, 2011

(65) Prior Publication Data
US 2012/0327356 A1    Dec. 27, 2012

(30) Foreign Application Priority Data
Mar. 12, 2010  (FR) ...................................... 10 01004

(51) Int. Cl.
*C09K 19/02* (2006.01)
*G02F 1/13* (2006.01)

(52) U.S. Cl.
USPC ............ 349/175; 349/177; 349/169; 349/194

(58) Field of Classification Search
CPC .......... G02F 1/13718; G02F 1/134363; G02F 1/1391; G02F 1/1393; G02F 1/1333; G02F 1/133528; G02F 2001/13775; G02F 2001/133543; G02B 5/3016; C09K 19/586
USPC .................................. 349/175, 177, 169, 194
See application file for complete search history.

(56) References Cited

U.S. PATENT DOCUMENTS 4,277,144 A * 7/1981 Saurer et al. ................... 349/129
5,561,540 A * 10/1996 Brosig et al. ..................... 349/96
(Continued)

FOREIGN PATENT DOCUMENTS

| EP | 1 688 783 A1 | 8/2006 | |
| EP | 2 545 409 B1 * | 2/2013 | .............. G02F 1/137 |
| JP | 60-86521 A | 5/1985 | |

OTHER PUBLICATIONS

H. Baessler, et al., "Electric Filed Effects on the Optical Rotatory Power of a Compensated Cholesteric Liquid Crystal", Journal of Chemical Physics, Oct. 15, 1969, pp. 3213-3219, vol. 51, No. 8, American Institute of Physics, New York, NY, USA, XP009140194.

(Continued)

Primary Examiner — Mike Qi
(74) Attorney, Agent, or Firm — Baker Hostetler LLP

(57) ABSTRACT

An unpolarized light beam phase modulator emitting in a given wavelength range comprises at least one cell containing a liquid crystal having a helical structure and means for applying a voltage to said cell, said liquid crystal having a torsion elastic constant greater than its twisting elastic constant so as to ensure continuous stable behavior voltage-wise, said liquid crystal having a sufficient number of turns and in which the axis of the turns is in the light-propagation direction, making it possible to obtain an optical effect generated by the liquid crystal on the electrical field that is identical regardless of the direction of this electrical field, said cell being transparent in said wavelength range.

10 Claims, 5 Drawing Sheets

(56) References Cited

U.S. PATENT DOCUMENTS 5,928,733 A * 7/1999 Yoneya et al. .................. 428/1.3
2007/0139586 A1 6/2007 Gu et al.

OTHER PUBLICATIONS

Young-Chol Yang, et al., "Theoretical Study on the Homeotropic-Transient Planar Transition of Cholesteric Liquid Crystals", Japanese Journal of Applied Physics, Feb. 2001, pp. 649-653, Part. 1, No. 2a, The Japan Society of Applied Physics, XP002638239.

Yi-Hsin Lin, et al., "Polarization-Independent Liquid Crystal Phase Modulator Using a Thin Polymer-Separated Double-Layered Structure", Optics Express, Oct. 31, 2005, pp. 8746-8752, vol. 13, No. 22, Optical Society of America.

Gordon D. Love, "Liquid-Crystal Phase Modulator for Unpolarized Light", Applied Optics, May 1, 1993, pp. 2222-2223, vol. 32, No. 13, Optical Society of America.

* cited by examiner

PHASE MODULATOR CONTAINING A LIQUID CRYSTAL HAVING A HELICAL STRUCTURE

CROSS-REFERENCE TO RELATED APPLICATIONS

This application is a National Stage of International patent application PCT/EP2011/053392, filed on Mar. 7, 2011, which claims priority to foreign French patent application No. FR 1001004, filed on Mar. 12, 2010, the disclosures of which are incorporated by reference in their entirety.

FIELD OF THE INVENTION

The field of the invention is that of liquid crystal-based devices, that have applications in optical devices such as lenses, wave-front correctors, and notably in order to be integrated in optical zooms or cameras. Generally, wave-front correctors can also advantageously be used in power laser devices in order to correct laser beam aberrations and do so to increase the focusing quality of said power beam generated at the output.

BACKGROUND

FIG. 1 illustrates an exemplary configuration from the prior art using a liquid crystal-based phase modulator 1 that can be used to correct certain aberrations of a laser beam Fa and do so at the focal point of a lens 3. This device thus also comprises phase measuring means 2 and feedback means in a feedback loop Br that make it possible to occasionally correct the phase of the incident beam to correct its aberrations and supply a corrected beam Fc. The phase is directly linked to the optical index seen by a light beam and this is directly expressed in the following relationship:

$\varphi = 2\pi n(\lambda) z / \lambda$, with z being the distance travelled by the beam in the medium.

One of the main characteristics of liquid crystal cells lies in the fact that it is possible to cause the optical index of the medium to be changed by the application of an electrical field. In effect, the liquid crystal molecules, notably nematic molecules have an ordinary optical axis and an extraordinary optical axis which are respectively along the directing vector D and perpendicular to said directing vector D, as is represented in FIG. 2. These molecules can be oriented under the action of an applied electrical field and the three positions (a), (b) and (c) represented in FIG. 2 respectively relate to a weak field (below the field needed to be able to begin orienting the molecules), an average field and a strong field.

By changing the orientation of said molecules, it thus becomes possible to vary the average optical index seen by a light beam passing through the medium. Generally, an untwisted nematic of positive or negative dielectric anisotropy is used, integrated in a cell more specifically comprising a polarizer at the input, two substrates, one of which, by virtue of a prior surface state, makes it possible to constrain the molecules in an initial state.

Such a device operates with a light that is polarized in the axis of the director of the liquid crystals. In the case of a positive dielectric anisotropy, light at the input of the device sees the extraordinary index of the liquid crystal when the device is at rest (zero voltage), and, as the field increases, with the liquid crystal molecules straightening, the light sees an intermediate index between the ordinary and extraordinary index. To modify the phase of an unpolarized light, this phase-shifting operation must be performed on both components of the electrical field, and for this, it is possible either to superpose two devices as described in the article: Polarization-independent liquid crystal phase modulator using a thin polymer-separated double-layered structure, by Yi-Hsin Lin, Hongwen Ren, Yung Hsun Wu, Zhibing Ge and Shin-Tson Wu: *College of Optics and Photonics, University of Central Florida, Orlando, Fla.*, 32816 and Yue Zhao and Jiyu Fang: *Advanced Materials Processing and Analysis Center and Department of Mechanical Materials*, or to use a quarter-wave plate and a mirror and thus cause the light to pass twice in the same device thus acting on the two components of the electrical field as described in the article: Liquid-crystal phase modulator for unpolarized light by Gordon D, Love, *APPLIED OPTICS*/Vol. 32, No. 13/1 May 1993.

In the first case, the superposition poses major parallax problems and therefore does not allow for the superposition of matrices with small pixels. In the second case, the use of a reflector in the optical path makes it into a reflection device which cannot therefore be integrated in a conventional optic (optical zoom for imager for example).

Also known are liquid crystal cells of cholesteric type in which the molecules are not arranged exactly parallel to one another but adopt a helical configuration. If a cross-section is taken in the structure along a plane perpendicular to the axis z of the spiral, the distortion of the molecules in the plane is similar to that of a nematic but the preferred direction of orientation of the molecules turns slowly when moving along the axis z. A periodic helical structure is thus obtained along the direction z perpendicular to the plane of the layers. Depending on the illumination wavelength and the pitch of the helix, such structures may behave partially as mirrors if the following condition is verified:

p=λ/n with λ being the wavelength of the wave and n being the index of the liquid crystal medium.

Generally, the liquid crystals of cholesteric type are spontaneously oriented in a preferred direction n of the space that is called the director. When an applied electrical field has constrained them in a certain orientation, the molecules have a tendency to revert to this state in response to a deformation.

A deformation can be broken down into three distortions. In fact, in response to a deformation, a liquid crystal molecule undergoes a pair of forces which have the effect of opposing it so as to revert to the state in which all the molecules are aligned. Furthermore, when an electrical field is applied to said molecules, the molecules have a tendency to be aligned parallel to the field because of the polarization of the molecules.

There is then competition between the effect of alignment parallel to the electrical field and the elastic properties of the medium. It can be considered that the elastic deformations of liquid crystal molecules are of three types:
  fan out deformation;
  torsional deformation;
  twist deformation, also called twisting.

These three types of deformation are illustrated in FIG. 3.

The diagram of FIG. 4 illustrates the existence of the different possible states, upon the application of an electrical field and upon the progressive elimination of the application of an electrical field.

More specifically:
  the so-called "planar" state P corresponds to a state in which the molecules are in a helix with a vertical axis;
  the so-called "focal conical" state CP corresponds to a state in which, for liquid crystal molecules with positive dielectric anisotropy, in the axis of the helix, there is a perpendicular epsilon below the mean epsilon of the direction perpendicular to the plane of the electrodes. Under voltage, the helix, before being deformed, tends to lie down;

the so-called "homeotropic" state H corresponds to a state in which all the molecules are vertical, coming directly from the "planar" state or else from the "focal conical" state for which the pitch will gradually increase until it is completely unwound;

the "transient planar" state PT corresponds to a "planar" state for which the pitch is greater than the initial pitch.

The "planar"/"homeotropic" transition has been studied in more detail. The liquid crystal molecules form a helical structure with a helix axis perpendicular to the plane of the layers. The so-called polar angle θ that the molecules form with this axis tends to increase with a reduction of the applied electrical field. When this angle is equal to π/2, the molecules are in a so-called planar structure.

In this approach, it is considered that the polar angle θ is independent of the axis z and that the azimuthal angle φ varies along the axis z with a constant q relative to the wave vector of the helix, in such a way that the "twist" parameter is constant, these angles being represented in FIG. 5.

The components of the directing vector n of a molecule are thus given by the following formulae:

$n_x = \sin\theta \cos(qz), n_y = \sin\theta \sin(qz)$ and $n_z = \cos\theta$

The free energy is given by the following formula:

$f = \frac{1}{2}K_{22}(q_0 - q\sin^2\theta)^2 + \frac{1}{2}K_{33}q^2 \sin^2\theta \cos^2\theta + \frac{1}{2}\Delta\epsilon\epsilon_0 E^2 \sin^2\theta$ $q_0$, corresponds to the constant with zero electrical field; the pitch of the helix p being equal to π/q.

The constants $K_{22}$ and $K_{33}$ corresponding to the torsion and "twist" elastic constants.

By using the following parameters:

$K_3 = K_{33}/K_{22}, \psi = f/K_{22}q_0^2$, and $e = E/E_c$

The following equation is obtained:

$\psi = \frac{1}{2}(1 - \lambda\sin^2\theta) + \frac{1}{2}K_3\psi^2 \sin^2\theta \cos^2\theta + \frac{1}{2}(\pi/2e)^2 \sin^2\theta$ By seeking to minimize the parameter ψ, the following is obtained:

$\lambda = 1/(\sin^2\theta + K_3 \cos^2\theta)$ and $q = q_0/(\sin^2\theta + K_3 \cos^2\theta)$ When the polar angle θ is very small, it can be considered that:

$q = q_0/K_3 = (K_{22}/K_{33})q_0$ and therefore the pitch of the helix $p = (K_{22}/K_{33})p_0$ For most of the known liquid crystals, the rate $K_{33}/K_{22}$ is greater than 1, even of the order of 2. A pitch of the helix is thus obtained which is of the order of 2 times the initial pitch $p_0$ of the helix. With, in addition, a very small polar angle θ, the following equation can be obtained:

$$\psi = \frac{1}{2} + \frac{1}{2}\sin^2\theta\left[\left(\frac{\pi}{2}e\right)^2 - \frac{1}{K_3 + (1 - K_3)\sin^2\theta}\right]$$

$$E_c = \frac{\pi^2}{P_0}\left(\frac{K_{22}}{\varepsilon_0\Delta\varepsilon}\right)^{1/2}$$

To analyze whether it is possible to have a stable state in a conical helix structure, the second derivative of the function ψ is studied:

The second derivative relative to the angle θ (or $\sin^2\theta$) is written:

$$\frac{\partial^2\psi}{\partial(\sin^2\theta)^2} = \frac{K(1-K)}{[K + (1-K)\sin^2\theta]^2}$$

And, effectively, if $K_{33} > K_{22}$, 1−K is negative whatever the angle θ and therefore the energy is a curve with downward concavity and does not show any minimum therefore stable state as is illustrated by FIG. 6.

SUMMARY OF THE INVENTION

The applicant thus started from this analysis to propose using a liquid crystal having a coefficient $K_{22}$ greater than its coefficient $K_{33}$ so as to generate a stable state in such a helical structure and do so in order to make it possible to have a structure than can be exploited in terms of phase modulation and thus overcome the problem of bi-stability currently encountered with the helical structure liquid crystal modulators.

More specifically, the subject of the present invention is an unpolarized light beam phase modulator emitting in a given wavelength range, characterized in that it comprises at least one cell containing a liquid crystal having a helical structure and means for applying a voltage to said cell, said liquid crystal having a torsion electric constant ($K_{22}$) greater than its twisting elastic constant ($K_{33}$) so as to ensure continuous stable behavior voltage-wise, said liquid crystal having a sufficient number of turns and in which the axis of the turns is in the light-propagation direction making it possible to obtain an optical effect generated by the liquid crystal on the electrical field that is identical regardless of the direction of this electrical field, said cell being transparent in said wavelength range.

Thus, there is no need, as in the prior art, to superpose two matrices, or to use a reflector. The use of a helical liquid crystal with a sufficient number of turns and in which the axis of the turns is in the light-propagation direction makes it possible to obtain an optical effect generated by the liquid crystal on the electrical field that is identical whatever the direction of the this electrical field. Thus, an unpolarized light undergoes, on its two components (of an arbitrary coordinate system) the same correction.

According to a variant of the invention, the liquid crystal is a cholesteric liquid crystal.

According to a variant of the invention, the liquid crystal is a mixture comprising a nematic liquid crystal and cholesteric molecules.

According to a variant of the invention, the liquid crystal is a mixture of cholesteryle chloride and of cholesteryle myristate.

According to a variant of the invention, the thickness of the cell and the pitch of the helix are gauged to generate at least one helix turn in the helical structure.

According to a variant of the invention, the modulator comprises a matrix arrangement of the liquid crystal cells so as to constitute a spatial light modulator.

Another subject of the invention is an optical device, characterized in that it comprises a phase modulator according to the invention and an emitting source intended to be modulated by said phase modulator.

Yet another subject of the invention is a lens with variable focal length, characterized in that it comprises an optical device comprising a modulator of the invention.

Another subject of the invention is a zoom, characterized in that it comprises at least one lens coupled to displacement means and one lens with variable focal length according to the present invention.

The final subject of the invention is a device for correcting wave-fronts of a light beam, characterized in that it comprises a phase modulator according to the invention, phase measuring means at the output of said modulator and feedback means acting on said phase modulator.

BRIEF DESCRIPTION OF THE DRAWINGS

The invention will be better understood, and other advantages will become apparent, from reading the following description, given as a nonlimiting example, and using the appended figures in which.

DETAILED DESCRIPTION

Generally, and according to the invention, the phase modulator comprises at least one liquid crystal cell operating in unpolarized light mode and illuminated by a light beam. The liquid crystal has a helix pitch that is calculated not to behave as a Bragg mirror in the radiation range covered by the application.

Typically, for operation in visible light, a helix pitch greater than approximately 0.5 μm can be chosen.

It comprises a liquid crystal cell comprising at least two surfaces that make it possible to apply a voltage and, advantageously, surface treatments that make it possible to assist in the pre-orientation of the liquid crystal molecules. The liquid crystal molecules are chosen to be capable of being organized in a helical structure with a variable helix pitch dependent on the field applied to said cell. It may be pure liquid crystal or nematic-type liquid crystal, in which the helical structure is conferred by virtue of the presence of cholesteric molecules.

The principle applied in the phase modulator of the invention is as follows:

A light passes through a cell with a structure of molecules organized as a so-called "super-twisted" helix and which is sufficiently thin, capable with or without applied field, of undergoing a phase variation $\Delta\phi=\Delta n\ d/\lambda\ \pi$ and do so while undergoing virtually no rotational light effect, thus seeing an average index $n_{eff}=\frac{1}{2}(n_e+n_o)$, if said light sees a sufficient number of helix turns.

The thickness of the cell is chosen so as to allow for transmission mode operation close to 100% and do so whatever the angle of incidence of the light beam to be phase modulated.

The liquid crystal cell comprises a liquid crystal that has a coefficient $K_{22}$ greater than its coefficient $K_{33}$.

Figure 1:
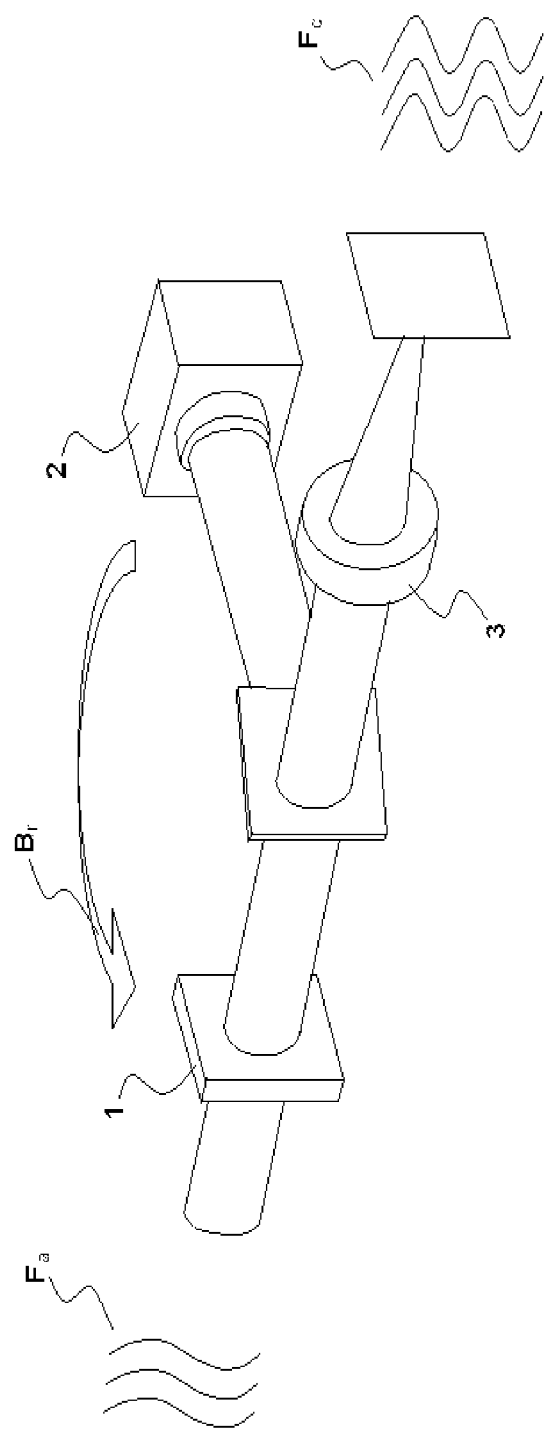
FIG. 1 illustrates an exemplary wave-front correction device comprising a phase modulator according to the prior art.
Figure 2:
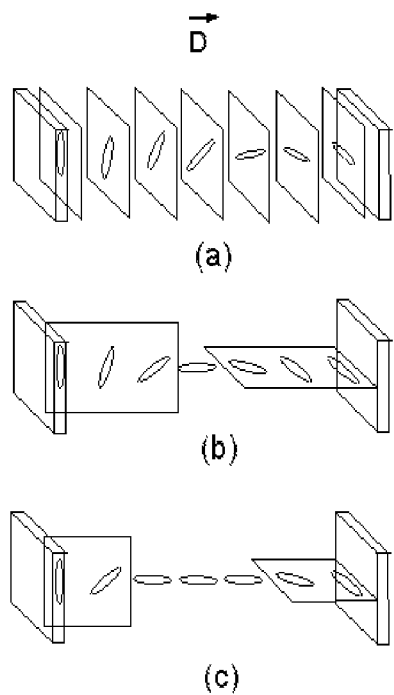
FIG. 2 schematically represents the orientation of liquid crystal molecules under the action of an electrical field.
Figure 3:
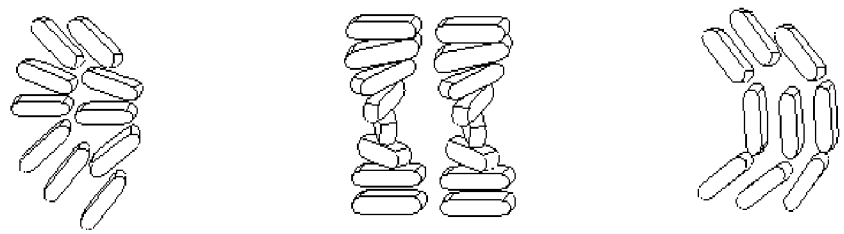
FIG. 3 illustrates the different types of elastic deformation to which liquid crystal molecules are subjected.
Figure 4:
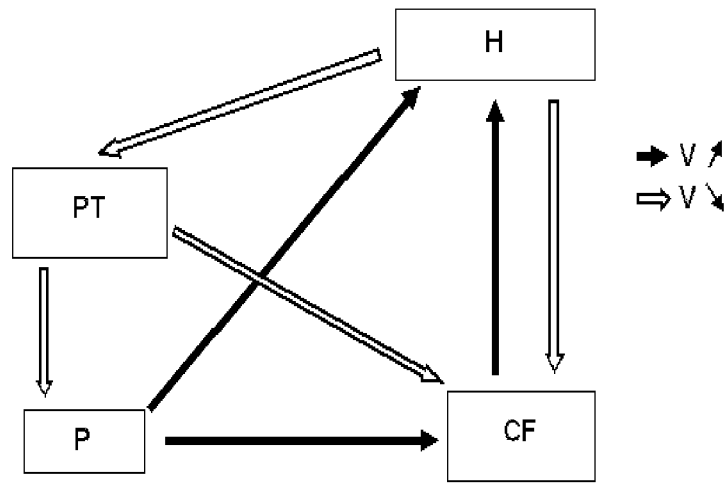
FIG. 4 illustrates a diagram of the possible different states of cholesteric molecules.
Figure 5:
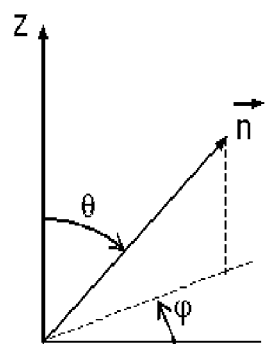
FIG. 5 illustrates the polar and azimuthal angle of a liquid crystal molecule.
Figure 6:
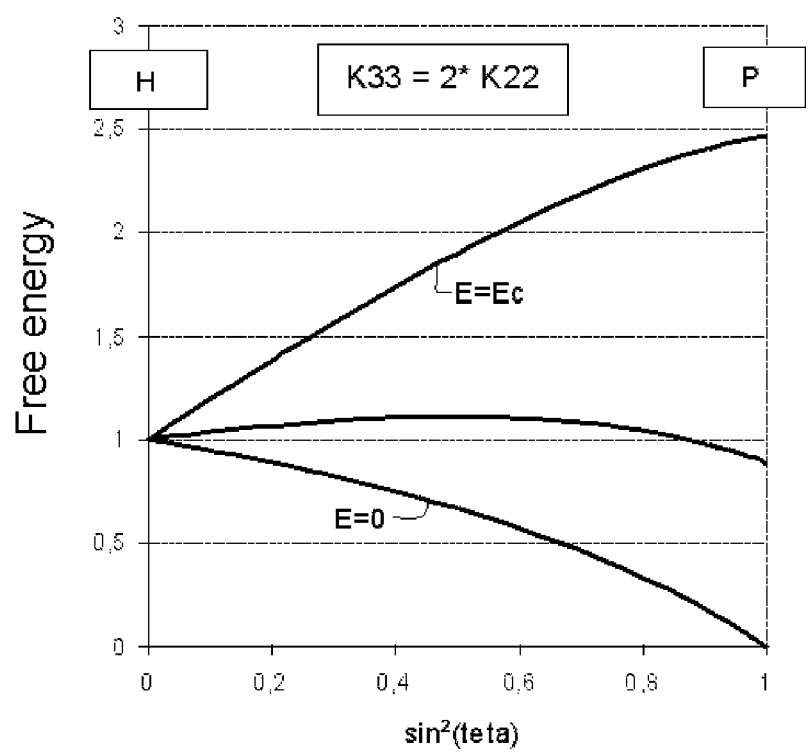
FIG. 6 illustrates the trend of the free energy as a function of the polar angle θ for liquid crystal molecules that have a coefficient $K_{22}$ less than the coefficient $K_{33}$, according to the prior art.
Figure 7:
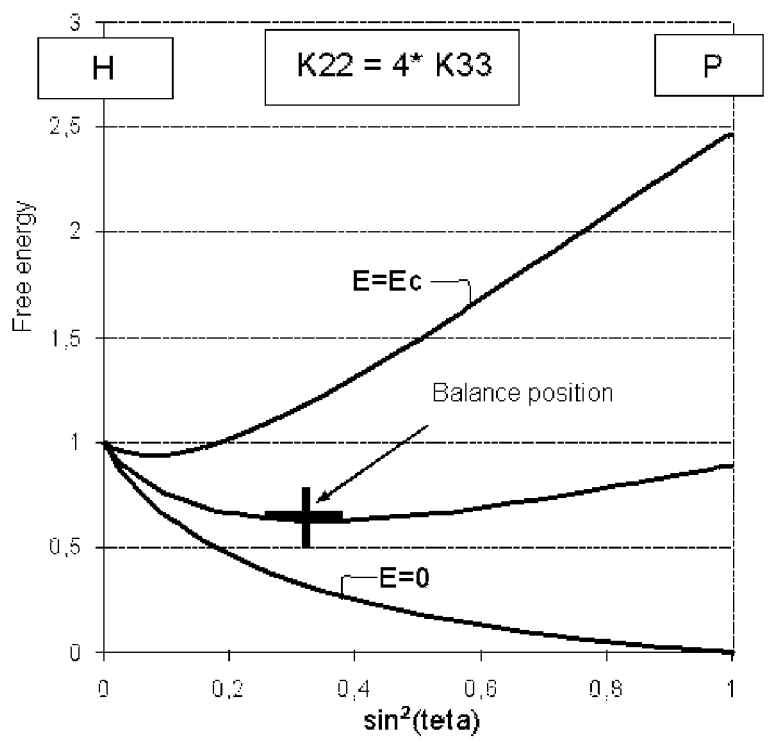
FIG. 7 illustrates the trend of the free energy as a function of the polar angle θ for liquid crystal molecules that have a coefficient $K_{22}$ greater than the coefficient $K_{33}$ according to the invention.

Typically, with the condition $K_{22}=4*K_{33}$, the curves illustrated in FIG. 7 are obtained, thus revealing a curve with potential dips relating to the presence of a stable state.

The delay that can be produced is proportional to the thickness of the cell. When the thickness increases, the induced ellipticity decreases. However, a higher addressing voltage is necessary. One method for increasing the phase or delay variation range is to increase the so-called "super-twist" ratio by using a suitable helix pitch.

Typically, with a cell 12π with a thickness of 8 μm, the light passing through encounters 6 complete helix turns. This can be obtained with a cholesteric structure pitch of between approximately 1.23 μm and 1.45 μm, the electrode surfaces also conventionally comprising surface treatments that make it possible, by friction to influence the prior orientations of the molecules at the edges of said surfaces.

By switching from a voltage of 0 volt to an applied voltage of 20 volts, it is thus possible to produce phase shifts of 2π for a do eff of 0.1 and a wavelength of 0.8 μm.

There is nevertheless an optimum between the number of turns that the light should see and the voltage to be applied to the cell. In practice, the higher the number of helix turns, the higher the voltage to be applied but the better the ellipticity.

Figure 8:
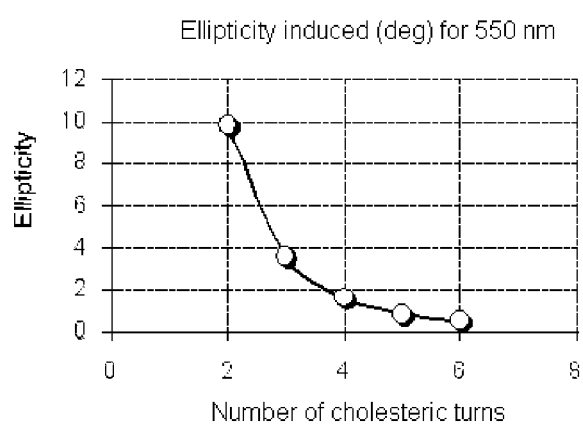
FIG. 8 illustrates the trend of the ellipticity induced on a rectilinear polarzed light at the input as a function of the number of helix turns in a spatial modulator of the invention.

The applicant has thus been able to reveal this observation illustrated in FIG. 8 for a cell scaned at 550 nm.

The liquid crystal cell comprises a liquid crystal that has a coefficient $K_{22}$ greater than its coefficient $K_{33}$.

Example of Matrix Phase Modulator Operating in the Visible

The modulator conventionally comprises a matrix of pixels that can be addressed by a control matrix so as to be able to produce a phase modulation matrix. Typically, the pixels have dimension of 50 μm by 50 μm, the whole making a few millimeters. The electrodes are organized conventionally in rows and columns. Advantageously, the pixels are controlled by a transistor and constitute an active matrix.

The liquid crystal cells comprise a liquid crystal of cholesteric type, comprising, for example, a liquid crystal mixture of cholesteryle chloride and cholesteryle myritate in the proportions 1.75 to 1, and thus having a coefficient $K_{22}$ greater than its coefficient $K_{33}$. The thickness of the cells is of the order 8 μm.

Such a phase modulator can advantageously be integrated as a lens in a small zoom.

The invention claimed is:

1. An unpolarized light beam phase modulator emitting in a given wavelength range, comprising:
    at least one cell containing a liquid crystal having a helical structure and means for applying a voltage to said cell, said liquid crystal having a torsion elastic constant greater than a twisting elastic constant so as to ensure continuous stable behavior voltage-wise, said liquid crystal having a sufficient number of turns and in which the axis of the turns is in the light-propagation direction, making it possible to obtain an optical effect generated by the liquid crystal on the electrical field that is identical regardless of the direction of this electrical field, said cell being transparent in said wavelength range.

2. The phase modulator as claimed in claim 1, wherein the liquid crystal is a cholesteric liquid crystal.

3. The phase modulator as claimed in claim 1, wherein the liquid crystal is a mixture comprising a nematic liquid crystal and cholesteric molecules.

4. The phase modulator as claimed in claim 1, wherein the liquid crystal is a mixture of cholesteryle chloride and of cholesteryle myristate.

5. The phase modulator as claimed in claim 1, wherein the thickness of the cell and the pitch of the helix are gauged to generate at least one helical turn in the helical structure.

6. The phase modulator as claimed in claim 1, comprising a matrix arrangement of the liquid crystal cells so as to constitute a spatial light modulator.

7. A device for correcting wave-fronts of a light beam, comprising a phase modulator as claimed in claim 6, phase measuring means at the output of said modulator and feedback means acting on said phase modulator.

8. An optical device, comprising a phase modulator as claimed in claim 1 and an emitting source intended to be modulated by said phase modulator.

9. A lens with variable focal length, comprising an optical device as claimed in claim 8.

10. A zoom, comprising at least one lens coupled to displacement means and one lens with variable focal length as claimed in claim 9.

* * * * *